(12) United States Patent
Lin et al.

(10) Patent No.: US 11,621,427 B2
(45) Date of Patent: Apr. 4, 2023

(54) CATHODE FOR SOLID OXIDE FUEL CELLS

(71) Applicant: PHILLIPS 66 COMPANY, Houston, TX (US)

(72) Inventors: Ye Lin, Bartlesville, OK (US); Ying Liu, Bartlesville, OK (US); Matthew Lundwall, Bartlesville, OK (US); James A. Enterkin, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 63 days.

(21) Appl. No.: 17/308,420

(22) Filed: May 5, 2021

(65) Prior Publication Data
US 2021/0351417 A1 Nov. 11, 2021

Related U.S. Application Data

(60) Provisional application No. 63/020,102, filed on May 5, 2020.

(51) Int. Cl.
| H01M 4/90 | (2006.01) |
| H01M 4/88 | (2006.01) |
| H01M 4/86 | (2006.01) |
| H01M 8/1226 | (2016.01) |
| H01M 8/1246 | (2016.01) |
| H01M 8/1213 | (2016.01) |
| H01M 8/124 | (2016.01) |
| H01M 8/12 | (2016.01) |

(52) U.S. Cl.
CPC ....... *H01M 4/9033* (2013.01); *H01M 4/8657* (2013.01); *H01M 4/8885* (2013.01); *H01M 4/9066* (2013.01); *H01M 8/124* (2013.01); *H01M 8/1213* (2013.01); *H01M 8/1226* (2013.01); *H01M 8/1246* (2013.01); *H01M 2004/8689* (2013.01); *H01M 2008/1293* (2013.01); *H01M 2300/0074* (2013.01)

(58) Field of Classification Search
CPC ............. H01M 2300/0074; H01M 2008/1293; H01M 4/9033; H01M 8/124; H01M 8/1246; H01M 8/1213; H01M 8/1226
See application file for complete search history.

(56) References Cited

U.S. PATENT DOCUMENTS

| 5,670,270 A * | 9/1997 | Wallin ................ H01M 8/1213 429/496 |
| 2002/0187389 A1* | 12/2002 | Wallin ................ H01M 4/9033 204/280 |

(Continued)

OTHER PUBLICATIONS

Mengran Li, Mingwen Zhao, Feng Li, Wei Zhou, Vanessa K. Peterson, Xiaoyong Xu, Zhongping Shao, Ian Gentle & Zhonghua Zhu, Nature Communications, A Niobium and Tantalum Co-Doped Perovskite Cathode for Solid Oxide Fuel Cells Operating Below 500 °C., Published Jan. 3, 2017, vol. 8, 13990, 9 pages.

(Continued)

*Primary Examiner* — Jeremiah R Smith
(74) *Attorney, Agent, or Firm* — Phillips 66 Company

(57) ABSTRACT

A solid oxide fuel cell comprising an anode layer, an electrolyte layer, and a two phased cathode layer. The two phased cathode layer comprises praseodymium and gadolinium-doped ceria. Additionally, the solid oxide fuel cell does not contain a barrier layer.

7 Claims, 4 Drawing Sheets

(56) References Cited

U.S. PATENT DOCUMENTS

| | | | | |
|---|---|---|---|---|
| 2015/0099211 A1* | 4/2015 | Bierschenk | ......... | H01M 4/8621 |
| | | | | 429/482 |
| 2015/0244001 A1* | 8/2015 | Samson | ............ | H01M 4/9041 |
| | | | | 502/101 |
| 2016/0329576 A1* | 11/2016 | Liu | ..................... | H01M 4/8803 |
| 2020/0075980 A1* | 3/2020 | Ding | .................. | H01M 8/1246 |
| 2022/0145480 A1* | 5/2022 | Tucker | ................ | H01M 4/8803 |

OTHER PUBLICATIONS

Sihyuk Choi, Seonyoung Yoo, Jiyoun Ki, Seonhye Park, Areum Jun, Sivaprakash Sengodan, Junyoung Kim, Jeeyoung Shin, Hu Young Jeong, YongMan Choi, Guntae Kim & Meilin Liu, Highly Efficient and Robust Cathode Materials for Low-Temperature Solid Oxide Fuel Cells: $PrBa.05Sr005Co2-xFexO56$.

Yuan Zhang, Xuechao Gao, Jaka Sunarso, Bo Liu, Wei Zhou, Meng Ni, and Zongping Shao, "Significantly Improving the Durability of Single-Chamber Solid Oxide Fuel Cells: a Highly Active Co2-Resistant Perovskite Cathode", ACS Applied Energy Materials, 2018, vol. 1, pp. 1337-1343.

Toshiaki Matsui, Siqi Li, Yuki Inoue, Norifumi Yoshida, Hiroki Muroyama, and Koichi Eguchi, Degradation Analysis of Solid Oxide Fuel Cells with $(La,Sr)(Co,Fe)O_3-\delta$ Cathode/$Gd_2O_3$—$CeO_2$ Interlayer/$Y_2O_3$—$ZrO_2$ Electrolyte System: the Influences of Microstructural Change and Solid Solution Formation, Journal of the Electrochemical Society, 2019, vol. 166 (4), pp. F295-F300.

Laura Almar, Heike Stormer, Mathhias Meffert, Julian Szasz, Florian Wankmuller, Dagmer Gerthen, and Ellen Ivers-Tiffee, Improved Phase Stability and Co2 Poisoning Robustness of Y-Doped $Ba0.5Sr0.5Co0.2Fe0.2O_3-\delta$ SOFC Cathodes at Intermediate Temperatures, ACS Applied Energy Materials, 2018, vol. 1, pp. 1316-1327.

Inyoung Jang, Sungmin Kim, Chanho Kim, Hyungjun Lee, Heesung Yoon, Taeseup Song, Ungyu Paik, "Interface Engineering of Yttrium Stabilized Zirconia/Gadolinium Doped Ceria Bi-Layer Electrolyte Solid Oxide Fuel Cell for Boosting Electrochemical Performance", Journal of Power Sources, 2019, vol. 435, 9 pages.

* cited by examiner

CATHODE FOR SOLID OXIDE FUEL CELLS

CROSS-REFERENCE TO RELATED APPLICATIONS

This application is a non-provisional application which claims the benefit of and priority to U.S. Provisional Application Ser. No. 63/020,102 filed May 5, 2020, titled "Cathode for Solid Oxide Fuel Cells," which is hereby incorporated by reference in its entirety.

STATEMENT REGARDING FEDERALLY SPONSORED RESEARCH OR DEVELOPMENT

None.

FIELD OF THE INVENTION

This invention relates to cathodes for solid oxide fuel cells.

BACKGROUND OF THE INVENTION

It is well known that most cathode materials such as lanthanum strontium manganite, lanthanum strontium cobalt ferrite and samarium strontium cobalt react with the yttrium doped zirconia (YSZ) electrolyte and form an insulating phase, $SrZrO_3$, significantly reducing fuel cell performance and stability. A typical mitigation strategy is to apply a thin barrier layer such as gadolinium doped ceria (GDC) between the cathode and YSZ electrolyte. However, a low conductivity solid solution $CeZrOx$, forms at the interface between GDC and YSZ at temperatures higher than 1200° C. When the sintering temperature is lower than 1250° C., the GDC barrier layer is known to be too porous to achieve high performance. It is extremely difficult to obtain dense GDC barrier layer while avoiding the formation of $CeZrOx$.

There exists a need for an improved cathode for solid oxide fuel cells.

BRIEF SUMMARY OF THE DISCLOSURE

A solid oxide fuel cell comprising an anode layer, an electrolyte layer, and a two phased cathode layer. The two phased cathode layer comprises praseodymium and gadolinium-doped ceria. Additionally, the solid oxide fuel cell does not contain a barrier layer.

In an alternate embodiment, solid oxide fuel cell comprising an anode layer, an electrolyte layer, and a two phased cathode layer is taught. The two phased cathode layer comprising a first phase consisting essentially of: praseodymium; cobalt; nickel; oxygen; and silver, and a second phase comprising essentially of: gadolinium-doped ceria. In this embodiment, the solid oxide fuel cell does not contain a barrier layer and the bonding strength of the two phased cathode layer and the electrolyte layer is formed by sintering the solid oxide fuel cell at temperatures less than 950° C.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Figure 1:
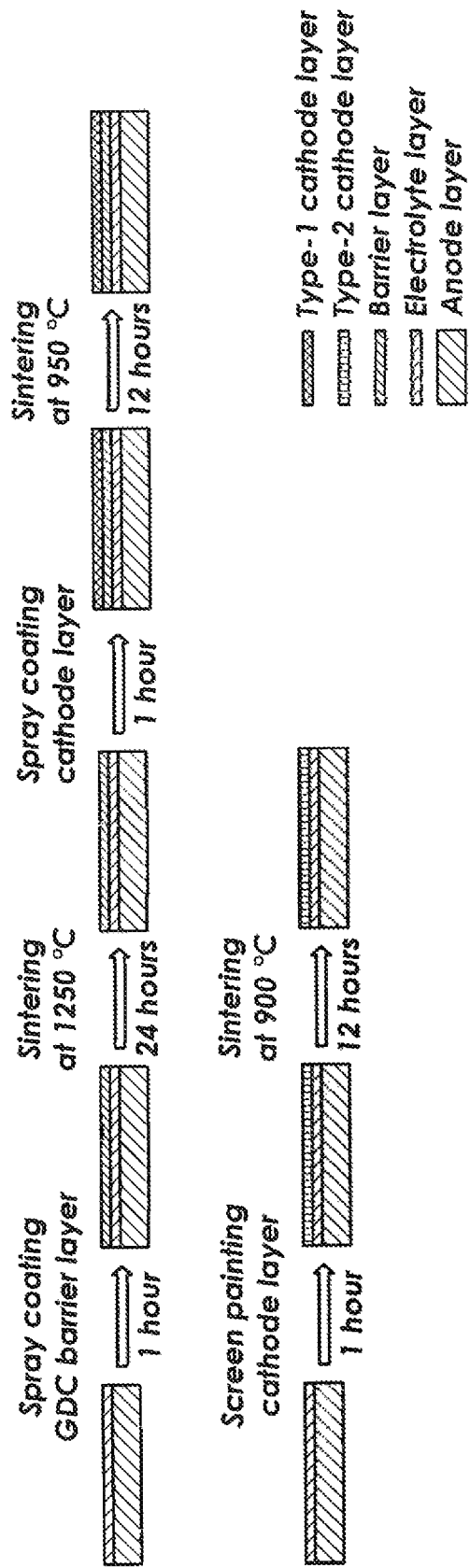
FIG. 1 depicts a conventional SOFC structure.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The present embodiment describes a solid oxide fuel cell with an anode layer, an electrolyte layer, and a two phased cathode layer comprising praseodymium and gadolinium-doped ceria. It is envisioned that the solid oxide fuel cell does not contain a barrier layer.

In one embodiment, the two phased cathode layer can comprise a first phase and a second phase. The first phase can either be consisting essentially of or consisting of praseodymium, cobalt, nickel, oxygen, and silver. The second phase can be consisting essentially of or consisting of gadolinium-doped ceria.

In one embodiment, the praseodymium is silver-doped praseodymium cobaltite. In another embodiment, the praseodymium is nickel-doped praseodymium cobaltite.

In yet another embodiment, the bonding strength of the two phased cathode layer and the electrolyte layer is formed by sintering the solid oxide fuel cell at temperatures less than 950° C. It is envisioned that only one sintering step for the solid oxide fuel cell cathode is performed.

In yet another embodiment, a solid oxide fuel cell is described with an anode layer, an electrolyte layer, and a two phased cathode layer comprising a first phase consisting essentially of: praseodymium; cobalt; nickel; oxygen; and silver, and a second phase comprising essentially of: gadolinium-doped ceria. In this embodiment, the solid oxide fuel cell does not contain a barrier layer and the bonding strength of the two phased cathode layer and the electrolyte layer is formed by sintering the solid oxide fuel cell at temperatures less than 950° C.

The following examples of certain embodiments of the invention are given. Each example is provided by way of explanation of the invention, one of many embodiments of the invention, and the following examples should not be read to limit, or define, the scope of the invention.

The first phase of the cathode layer was first formed by dissolving metal nitrate hydrates with stoichiometric ratios in deionized water. Citric acid (CA) was added as a chelating agent with a CA-to-nitrate-ion molar ratio of 1:2. The resulting clear solution was heated at 90° C. for a prolonged period until a clear gel was formed. The gel was placed in an oven overnight at 150° C. to form a foam. The foam was then ground and calcined at 800° C. for 5 h. The resultant product was $PrCo_{0.9}Ni_{0.1}O_{3-\delta}Ag_{0.1}$ (PCNA).

The second phase of the cathode layer gadolinium-doped ceria (GDC) was mixed with PCNA in a weight ratio of 60% PCNA:40% GDC to form a cathode powder. The cathode mixture was then mixed with a terpineol-based ink vehicle obtained from Nexceris, LLC in a weight ratio of 65% cathode powder:35% ink vehicle and milled in a high-energy ball mill at 350 rpm for 1 h to form the cathode ink.

This cathode ink was then used to form a novel solid oxide fuel cell (SOFC) as compared to a conventional SOFC as depicted in FIG. 1.

In a conventional anode supported SOFC, the process will begin by casting, either by spray coating or any other conventionally known technique, an electrolyte layer on top of an anode which is then followed by sintering at temperatures greater than 1400° C. This will be subsequently followed by casting, either by spray coating or any other conventionally known technique, a barrier layer on top of the electrolyte which is then followed by sintering at temperatures greater than 1,000° C. This temperature is depicted in FIG. 1 as 1,250° C. A cathode layer is then spray coated on top of the electrolyte, followed by a second sintering at a temperature of 950° C.

Applicants novel process begins similarly to the conventional method by casting, either by spray coating or any other conventionally known technique, an electrolyte layer on top of an anode which is then followed by sintering at temperatures greater than 1400° C. Applicants process then differs by directly casting, either by spray coating or any other conventionally known technique, a two-phase cathode layer on top of the electrolyte. This is followed by sintering only once at a lower temperature of 900° C.

Figure 2B:
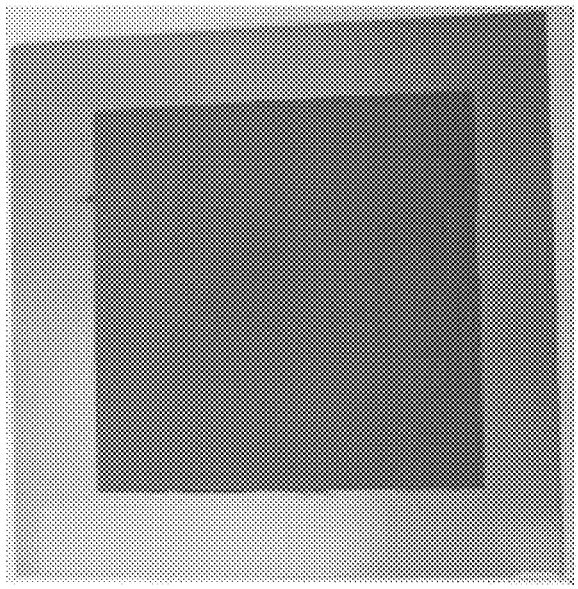
FIG. 2*b* depicts a SOFC without a barrier layer.
Figure 2D:
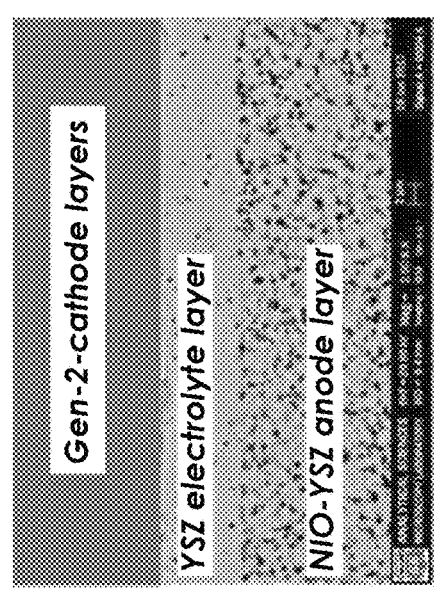
FIG. 2*d* depicts the associated structure layers of the SOFC without a barrier layer.
Figure 2A:
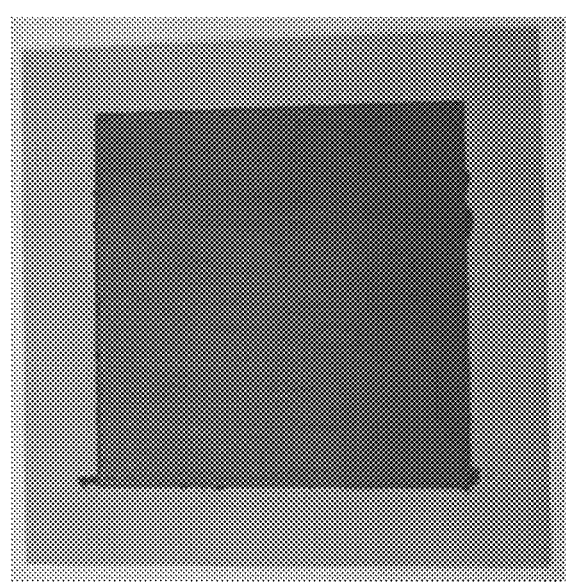
FIG. 2*a* depicts a SOFC with a barrier layer.
Figure 2C:
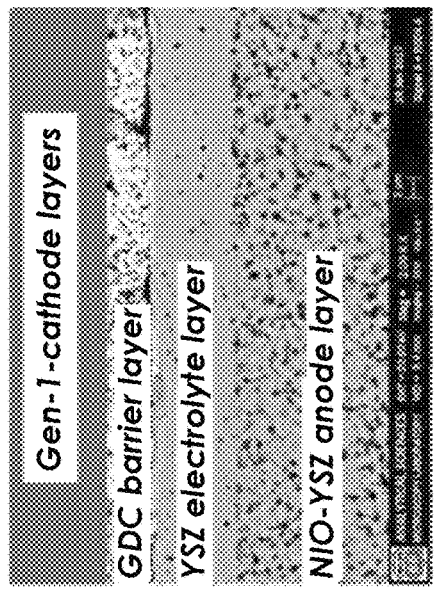
FIG. 2*c* depicts the associated structure layers of the SOFC with a barrier layer.

FIG. 2a depicts a SOFC with a barrier layer and FIG. 2c depicts the associated structure layers of the SOFC with a barrier layer. FIG. 2b depicts a SOFC without a barrier layer and FIG. 2d depicts the associated structure layers of the SOFC without a barrier layer.

The fuel cells were then tested between 500 and 750° C., and the impedance curves were taken at 650° C. under open circuit conditions.

As depicted below in Table 1 in which all the cells had a GDC barrier layer, PCNA-GDC provided enhanced performance. The Ag doping level was optimized to be approximately 10 mol % in the A site to provide the best fuel cell performance. At 650° C. and 0.8 V, the performance of the APC-GDC cathode layer reached 437 mW/cm$^2$, which is much higher than that of the undoped PrCoO3 (PC)-GDC cathode. Several state-of-the-art SOFC cathode materials were studied for comparison, including commercially available SSC-GDC and LSCF-GDC composites and in-house-prepared SrCo$_{0.8}$Ta$_{0.1}$Nb$_{0.1}$O$_3$ (SCTN) and PrBa$_{0.5}$Sr$_{0.5}$Co$_{1.5}$Fe$_{0.5}$O$_{5+\delta}$ (PBSCF). It is theorized that the significant performance enhancement may come from the increased active sites introduced by the Ag and Co$_3$O$_4$ nanoparticles together with the superior electronic conductivity of PC even under low-oxygen partial pressures.

TABLE 1

| Material composition | 650° C. and 0.8 V (mW/cm$^2$) | 700° C. and 0.8 V (mW/cm$^2$) |
|---|---|---|
| SSC-GDC | 380 | 540 |
| LSCF-GDC | 377 | 537 |
| SrCo$_{0.8}$Ta$_{0.1}$Nb$_{0.1}$O$_3$ (SCTN) | 268 | 398 |
| PrBa$_{0.5}$Sr$_{0.5}$Co$_{1.5}$Fe$_{0.5}$O$_{5+\delta}$ (PBSCF) | 372 | 509 |
| PrCoO$_3$-GDC | 308 | 469 |
| Ag$_{0.05}$Pr$_{0.95}$CoO$_3$-GDC | 355 | 525 |
| Ag$_{0.1}$Pr$_{0.9}$CoO$_3$-GDC | 437 | 636 |
| Ag$_{0.15}$Pr$_{0.85}$CoO$_3$-GDC | 405 | 600 |
| PrCo$_{0.9}$Ag$_{0.1}$O$_3$-GDC | 390 | 604 |

Figure 3A:
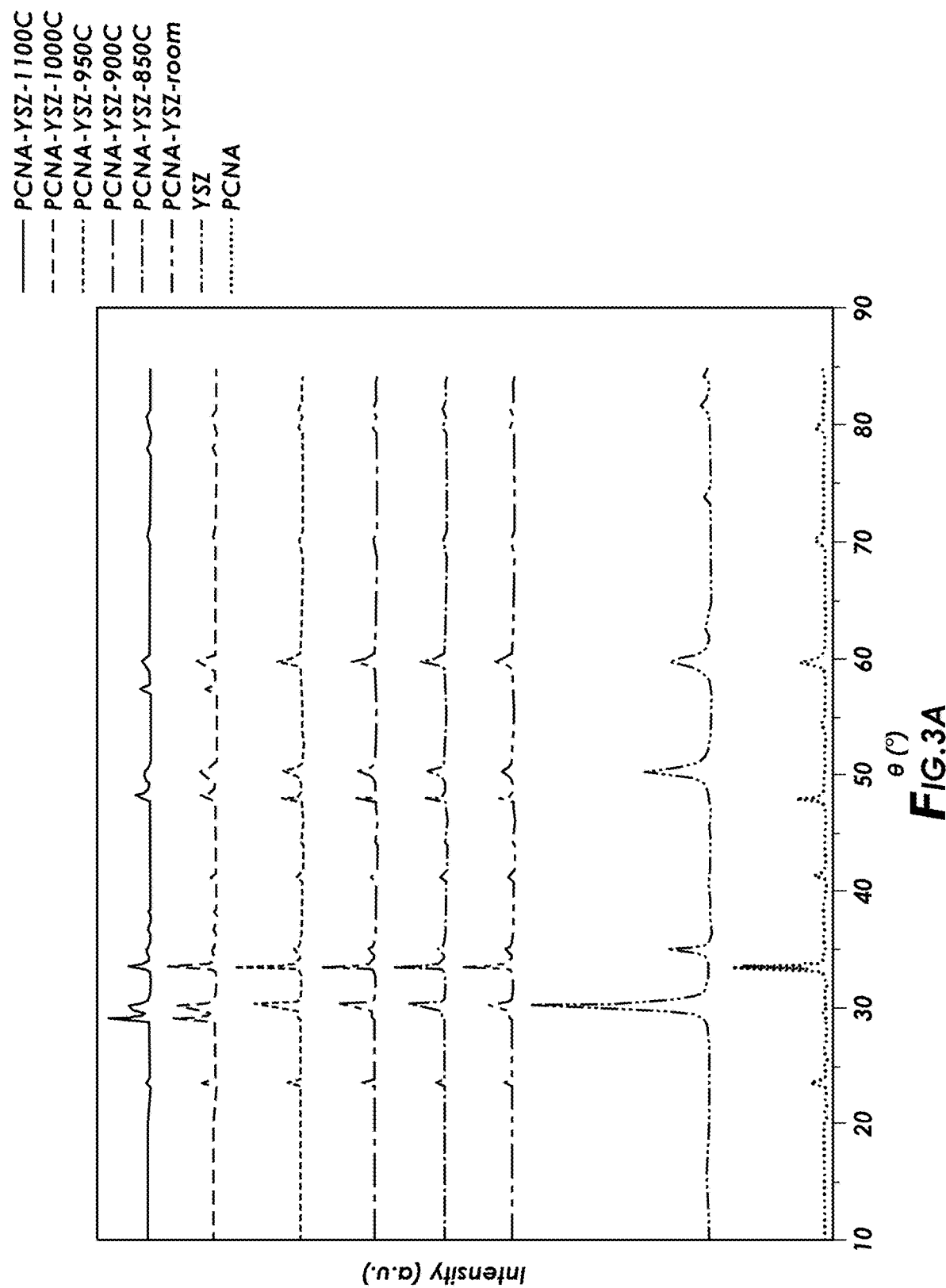
FIG. 3*a* depicts the XRD patterns of the PCNA-YSZ composite.
Figure 3B:
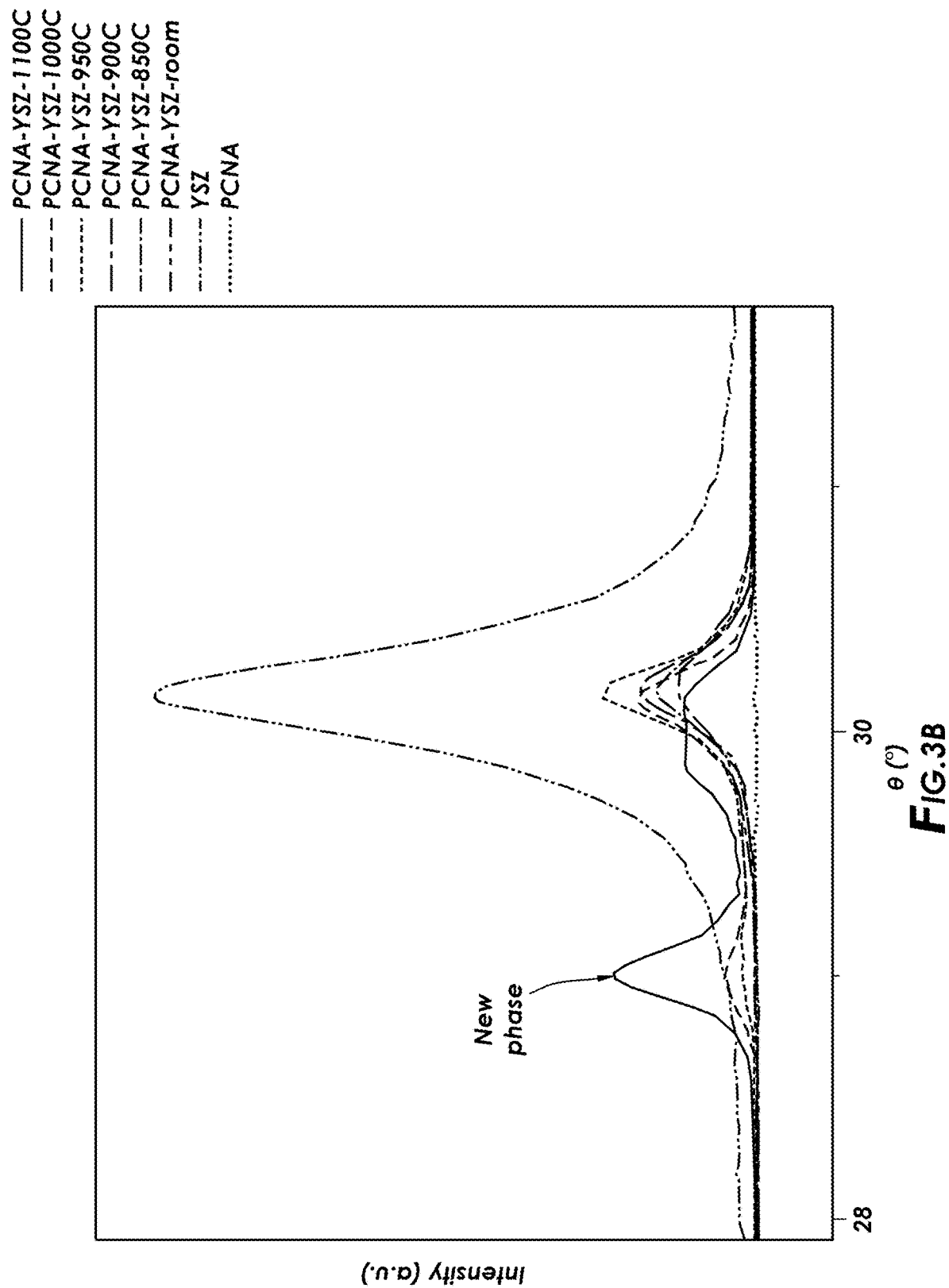
FIG. 3*b* depicts the XRD patterns of the PCNA-YSZ composite.

The refined Ag concentration is about 4.3 wt % in PCNA. Small nanoparticles (~10 nm) were found on the PCNA substrate. FIG. 3a shows the XRD patterns of the PCNA-YSZ composite with a weight ratio of 50:50 and sintered between 850 and 1,100° C. A secondary phase with a Pr$_2$Zr$_2$O$_7$ structure (main peak around 29.08°) was found at sintering temperatures of 950° C. and above see FIG. 3b. Therefore, 900° C. was determined to be the optimal sintering temperature for both PCN-GDC and PCNA-GDC. At this temperature, both good cathode-electrolyte bonding strength and minimal phase interactions were achieved.

Test results of fuel cells without a cathode barrier are shown in Table 2 below. PCA-GDC, PCN-GDC, and PCNA-GDC showed much higher performance than LSM-YSZ cathode.

TABLE 2

| | Power density at 0.8 V (mW/cm$^2$) | | |
|---|---|---|---|
| Material compositions | 600° C. | 650° C. | 700° C. |
| LSM-YSZ | 70 | 136 | 235 |
| PC-GDC | 203 | 406 | 585 |
| APC-GDC | 226 | 397 | 554 |
| PCA-GDC (two phase cathode) | 248 | 424 | 610 |
| PCN-GDC (two phase cathode) | 261 | 445 | 650 |
| PCNA-GDC (two phase cathode) | 330 | 500 | 782 |

The novel PCNA-GDC cells showed lower polarization resistance (Rp) than in conventional SOFC cells. The PCA-GDC showed the smallest Rp because of the extruded nano Pr$_5$O$_9$ oxides on the surface. With more oxygen vacancies created in PCN, a low Rp of 0.15 Ωcm$^2$ at 650° C. was achieved for PCN-GDC. Further Ag doping of PCNA-GDC reduced the Rp to 0.12 Ωcm$^2$ at 650° C. PCA-GDC, PCN-GDC, and PCNA-GDC performed better than conventional SOFC cells. In the novel cells, Rp was reduced by more than 50% compared to that of the SSC-GDC in conventional SOFC cells Table 3 depicts further results of the two phase cathode with different cathode materials.

TABLE 3

| | Rp (Ω cm$^2$) | | |
|---|---|---|---|
| Material composition | 600° C. | 650° C. | 700° C. |
| APC-GDC | 0.67 | 0.22 | |
| PCA-GDC (two phase cathode) | 0.37 | 0.12 | 0.03 |
| PCN-GDC (two phase cathode) | 0.54 | 0.15 | 0.054 |
| PCNA-GDC (two phase cathode) | 0.41 | 0.12 | 0.04 |

A fuel cell with a PCN-GDC cathode and without a GDC barrier layer showed 445 mW/cm$^2$ at 650° C. With Ag added, the PCNA-GDC performance reached a record high performance of 500 mW/cm$^2$ at 650° C. and 330 mW/cm$^2$ at 600° C. Neither of the cathode materials showed degradation in the short-term fuel cell tests. After 140 h of operation, Ag nano particles could still be observed on PCNA surface, and although the SSC was used as the cathode contact layer, no SrZrO$_3$ insulator could be detected at the interface based on EDX mapping results. The formation of GdCeZrYO$_x$ insulator was avoided by removing the GDC barrier layer, which further reduced the interfacial resistance. During the two phase cathode testing, impedance curves were recorded at 650° C. under open current voltage (OCV) conditions. The bulk conductivity of the two phase cathode was calculated assuming a YSZ thickness of 10 μm.

Table 4 depicts the bulk conductivity, which was improved by applying PCA-GDC, PCN-GDC, and PCNA-GDC cathode layers directly on the YSZ electrolyte

TABLE 4

| Material composition | Bulk (S/cm) conductivity |
|---|---|
| SSC-GDC | 0.0030 |
| PCA-GDC (two phase cathode) | 0.0082 |
| PCN-GDC (two phase cathode) | 0.0045 |
| PCNA-GDC (two phase cathode) | 0.0076 |
| YSZ | 0.008 |

The conductivity of cells with PCA-GDC and PCNA-GDC cathode materials was very close to the theoretical YSZ conductivity value of 0.008 s/cm at 650° C. However, because of formation of the $GdCeZrYO_x$ insulator between the YSZ and GDC electrolyte, the bulk conductivity of the baseline cell with the SSC-GDC cathode in a conventional SOFC was only 37.5% of the theoretical value for YSZ.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A solid oxide fuel cell comprising:
    an anode layer;
    an electrolyte layer; and
    a two phased cathode layer comprising: praseodymium and gadolinium-doped ceria, and
    wherein the solid oxide fuel cell does not contain a barrier layer separating physical contact between the electrolyte layer and the two phased cathode layer, and
    wherein the two phased cathode layer comprises a first phase and a second phase and the first phase consists essentially of: praseodymium; cobalt nickel; oxygen; and silver.

2. The solid oxide fuel cell of claim 1, wherein the second phase consists essentially of: gadolinium-doped ceria.

3. The solid oxide fuel cell of claim 1, wherein the bonding strength of the two phased cathode layer and the electrolyte layer is formed by sintering the solid oxide fuel cell at temperatures less than 950° C.

4. The solid oxide fuel cell of claim 3, wherein the solid oxide fuel cell undergoes only one sintering phase.

5. The solid oxide fuel cell of claim 1, wherein the praseodymium is silver-doped praseodymium cobaltite.

6. The solid oxide fuel cell of claim 1, wherein the praseodymium is nickel-doped praseodymium cobaltite.

7. A solid oxide fuel cell comprising:
    an anode layer;
    an electrolyte layer; and
    a two phased cathode layer comprising a first phase consisting essentially of: praseodymium; cobalt; nickel; oxygen; and silver, and a second phase consisting essentially of: gadolinium-doped ceria, and
    wherein the solid oxide fuel cell does not contain a barrier layer separating physical contact between the electrolyte layer and the two phased cathode layer and the bonding strength of the two phased cathode layer and the electrolyte layer is formed by sintering the solid oxide fuel cell at temperatures less than 950° C.

* * * * *